(12) United States Patent
Li et al.

(10) Patent No.: US 9,694,543 B2
(45) Date of Patent: Jul. 4, 2017

(54) ADDITIVE MANUFACTURING APPARATUS WITH ASSEMBLED AND DISASSEMBLED FEATURE

(71) Applicant: SHENZHEN WEISTEK TECHNOLOGY CO., LTD, Guangdong (CN)

(72) Inventors: Gen Li, Guangdong (CN); Yang Shen, Guangdong (CN); Zhihong Li, Guangdong (CN); Wenjuan Chen, Guangdong (CN)

(73) Assignee: Shenzhen Weistek Technology Co., Ltd. (CN)

( * ) Notice: Subject to any disclaimer, the term of this patent is extended or adjusted under 35 U.S.C. 154(b) by 0 days.

(21) Appl. No.: 14/381,676

(22) PCT Filed: Feb. 27, 2014

(86) PCT No.: PCT/CN2014/072643
§ 371 (c)(1),
(2) Date: Aug. 28, 2014

(87) PCT Pub. No.: WO2015/021770
PCT Pub. Date: Feb. 19, 2015

(65) Prior Publication Data
US 2016/0263831 A1    Sep. 15, 2016

(30) Foreign Application Priority Data

Aug. 16, 2013 (CN) .................... 2013 2 0503585 U

(51) Int. Cl.
*B29C 67/00* (2017.01)
*B33Y 30/00* (2015.01)
*B33Y 50/02* (2015.01)

(52) U.S. Cl.
CPC ...... *B29C 67/0088* (2013.01); *B29C 67/0085* (2013.01); *B33Y 30/00* (2014.12); *B29C 67/0059* (2013.01); *B33Y 50/02* (2014.12)

(58) Field of Classification Search
CPC ............ B29C 67/0088; B29C 67/0051; B29C 67/0059; B29Y 50/02

(Continued)

(56) References Cited

U.S. PATENT DOCUMENTS

| 5,402,351 A | 3/1995 | Batchelder |
| 2001/0050448 A1* | 12/2001 | Kubo .................. B29C 67/0077 264/308 |

(Continued)

FOREIGN PATENT DOCUMENTS

| CN | 101693407 A | 4/2010 |
| CN | 201516694 U | 6/2010 |
| CN | 103144306 A | 6/2013 |

OTHER PUBLICATIONS

International Search Report, PCT/CN2014/072643, Feb. 27, 2014.
Supplmentary European Search Report, European Application No. EP 14 75 2245, Jan. 11, 2016.

*Primary Examiner* — Nahida Sultana
(74) *Attorney, Agent, or Firm* — Tolpin & Partners, PC; Thomas W. Tolpin

(57) ABSTRACT

An additive manufacturing apparatus with assembled and dissembled feature includes a base having a cavity, a control circuit is installed in the cavity. An upper surface of the base defines a through hole for an electrical socket extending through the base and being exposed on the upper surface. A stand connecting member is provided on the upper surface. A material deposition device for depositing material is provided with a beam connecting member. A movable platform capable of moving along a Y axis direction for carrying the deposited material is provided with a column connecting member. A stand having a column, a beam is provided on a top of the column. The beam is provided with a material, deposition device connecting member. The column is provided with a movable platform connecting member. A bottom of the column is provided with at least one base connecting member corresponding to the base.

12 Claims, 14 Drawing Sheets

(58) Field of Classification Search
USPC .............. 264/109, 113, 293, 308, 494, 404; 425/174.4, 375
See application file for complete search history.

(56) References Cited

U.S. PATENT DOCUMENTS

| | | | | |
|---|---|---|---|---|
| 2002/0155189 | A1* | 10/2002 | John | B29C 67/007 425/174.4 |
| 2004/0005374 | A1 | 1/2004 | Narang | |
| 2004/0262803 | A1* | 12/2004 | Neilsen | B29C 67/0059 264/113 |
| 2005/0110200 | A1* | 5/2005 | Fong | B29C 35/0805 264/494 |
| 2005/0230870 | A1* | 10/2005 | Oriakhi | B28B 1/00 264/109 |
| 2006/0099287 | A1* | 5/2006 | Kim | B29C 67/0081 425/174.4 |
| 2006/0192312 | A1* | 8/2006 | Wahlstrom | B29C 67/0066 264/40.1 |
| 2012/0164256 | A1* | 6/2012 | Swanson | B29C 67/0055 425/162 |
| 2012/0258190 | A1* | 10/2012 | Batchelder | B29C 67/0055 425/375 |
| 2013/0009338 | A1 | 1/2013 | Mayer | |
| 2015/0224575 | A1* | 8/2015 | Hirata | B22F 3/003 524/503 |

\* cited by examiner

ADDITIVE MANUFACTURING APPARATUS WITH ASSEMBLED AND DISASSEMBLED FEATURE

FIELD OF THE INVENTION

The present invention relates to additive manufacturing technologies, and more particularly relates to an additive manufacturing, apparatus with assembled and dissembled feature.

BACKGROUND OF THE INVENTION

Additive manufacturing apparatuses of the prior art are difficult to be dissembled or assembled, they are usually assembled in the manufacturing factory and delivered to the customer as a whole. As a result, the additive manufacturing apparatus occupies a large volume and is difficult to be dissembled, which results in high transportation costs. In addition, the additive manufacturing apparatus may collide or fall during the transportation, such that the assembled components may be loose or displace, thus decreasing the materials forming precision and causing inconvenience to the user.

SUMMARY OF THE INVENTION

Accordingly, it is necessary to provide an additive manufacturing apparatus with assembled and dissembled feature.

An additive manufacturing apparatus with assembled and dissembled feature includes: a base having a cavity, wherein a control circuit is installed in the cavity, an upper surface of the base defines at least one through hole for an electrical socket extending through the base and being exposed on the upper surface; a stand connecting member is provided on the upper surface; a material deposition device for depositing material, at least one beam connecting member is provided on the material deposition device: a movable platform capable of moving along a Y axis direction for carrying the deposited material, wherein the movable platform is provided with at least one column connecting member; and a stand having at least one column, wherein a beam is provided on a top of the column; the beam is provided with a material deposition device connecting member; the column is provided with a movable platform connecting member; a bottom of the column is provided with at least one base connecting member corresponding to the base, wherein the material deposition device connecting member is connected to the beam connecting member, the material deposition device is mounted on the beam of the stand, and the material deposition device is capable of moving along the beam in an X axis direction: the movable platform connecting member is connected to the column connecting, member, the movable platform is mounted on the column of the stand, and the movable platform is capable of moving along the column in a Z axis direction, the stand connecting member is connected and fastened to the base connecting member, and the stand is vertically fixed to the upper surface of the base.

In one embodiment, the base connecting member defines at least one through hole for the electrical socket extending through the base connecting member and being exposed on the upper surface of the base connecting member.

In one embodiment, a side of the electrical socket received in the cavity is coupled to the control circuit for receiving a control signal outputted by the control circuit and power; another side of the electrical socket exposed on the upper surface of the base is respectively connected to the material deposition device, the movable platform, and the stand for transmitting control signal and power.

In one embodiment, the control circuit includes: a power source, a controller, a user interface module controlled by the controller, a fan control signal transmission module, a heating control signal transmission module, a temperature control signal transmission module, a data interface module, and a motor control signal transmission module; the fan control signal transmission module is connected to the material deposition device to drive control a fin of the material deposition device; the heating control signal transmission module is connected to the material deposition device to drive control a heating device of the material deposition device; the temperature control signal transmission module is connected to the material deposition device to adjust a heating temperature of the heating device; the motor control signal transmission module is connected to the material deposition device connecting member, the movable platform, and the movable platform connecting member, respectively, so as to control the movement thereof along the X axis direction, Y axis direction, and Z axis direction; the power source is respectively connected to the material deposition device, the material deposition device connecting member, the movable platform, and the movable platform connecting member for providing power.

In one embodiment, the control circuit further includes a signal detection module connected to the controller, the signal detection module is configured to detect coordinate origin data of X axis, Y axis, and Z axis directions, and send the detected coordinate origin data to the controller; the controller is configured to set the coordinate origin of the additive manufacturing apparatus with assembled and dissembled feature as a datum point, and calculate the movement direction and distance of motors of X axis, Y axis, and Z axis directions according to the coordinate origin of the design data, and generate motor drive control signals of X axis, Y axis, and Z axis directions.

In one embodiment, the motor control signal transmission module comprises an X axis direction control signal transmission interface, a V axis direction control signal transmission interface, and a Z direction control signal transmission interface; The motor control signal transmission module further includes a material deposition device motor control signal transmission interface connected to the material deposition device to control a deposition motor thereof.

In one embodiment, the control circuit is configured to receive a user instruction through the user interface module, and receive the design date through the data interface module, and control the material deposition device to deposit material; the control circuit is configured to control the movement of the material deposition device connector, the movable platform, and the movable platform connecting member to move along the X axis, V axis, and Z axis directions, respectively, thereby depositing the material on the movable platform and forming a three-dimensional model.

In one embodiment, the movable platform further includes a heating device; and the control circuit further comprises a platform temperature control signal transmission module and a platform heating control signal transmission module for the beating device of the movable platform: the platform heating control signal transmission module is connected to the heating device of the movable platform to drive control the heating thereof; the platform temperature control signal transmission module is connected to the heating device of the movable platform to adjust the heating temperature thereof.

In one embodiment, the electrical socket comprises at least one D-type socket and power socket; the fan control signal transmission module, the heating control signal transmission module, the temperature control signal transmission module, the motor control signal transmission module, the signal detection module, the platform temperature control signal transmission module, and/or the platform heating control signal transmission module are connected to at least one pin of the electrical socket, the signal is transmitted to the material deposition device, the material deposition device connecting member, the movable platform, the movable platform connecting member via the electrical socket.

In one embodiment, the material deposition device connecting member includes a guiding rail, a slider, an X axis direction motor, and an X axis direction movement support; the guiding rail is fixed to the beam, the slider is disposed on the guiding rail, the X axis direction movement support is fixed to the slider; the X axis direction motor drives the slider to make reciprocating motion in the X axis direction along the guiding rail; the X axis direction movement support is fastened to the material deposition device via thread or latch, thereby the material deposition device is capable of making reciprocating motion in the X axis direction along with the slider.

In one embodiment, the movable platform comprises a guiding rail, a slider, a Y axis direction motor, a Y axis direction movement support, and a material carrying plate; the guiding rail is fastened to the Y axis direction movement support via thread or latch, the slider is disposed on the guiding rail; the Y axis direction motor drives the slider to make reciprocating motion in the V axis direction along the guiding rail; the material carrying plate is fixed to the slider, thereby the material carrying plate is capable of making reciprocating motion in the Y axis direction to carry the deposited material from the material deposition device.

In one embodiment, the pivotable platform connecting member includes a guiding rail, a slider, a Z axis direction motor, and a Z axis direction movement support the guiding rail is fastened to the column, the slider is disposed on the guiding rail: the Z axis direction movement support is fixed to the slider; the Z axis direction motor drives the slider to make reciprocating motion in the Z axis direction along the guiding rail; the Z axis direction movement support is fastened to the column connecting member of the movable platform via thread or latch, thereby the movable platform is capable of making reciprocating motion in the Z axis direction.

The additive manufacturing apparatus according to the present invention can be assembled and disassembled easily, which occupies a small space and is easy to transport. The collision and the falling during transport can also be avoided, which may cause the assembled components be loose or displace. The present invention is simple to use, low cost, environmentally friendly, and economy.

BRIEF DESCRIPTION OF THE DRAWINGS

Reference will now be made to the drawings to describe, in detail, embodiments of the present invention, in which.

DETAILED DESCRIPTION OF THE EMBODIMENTS

Figure 1:
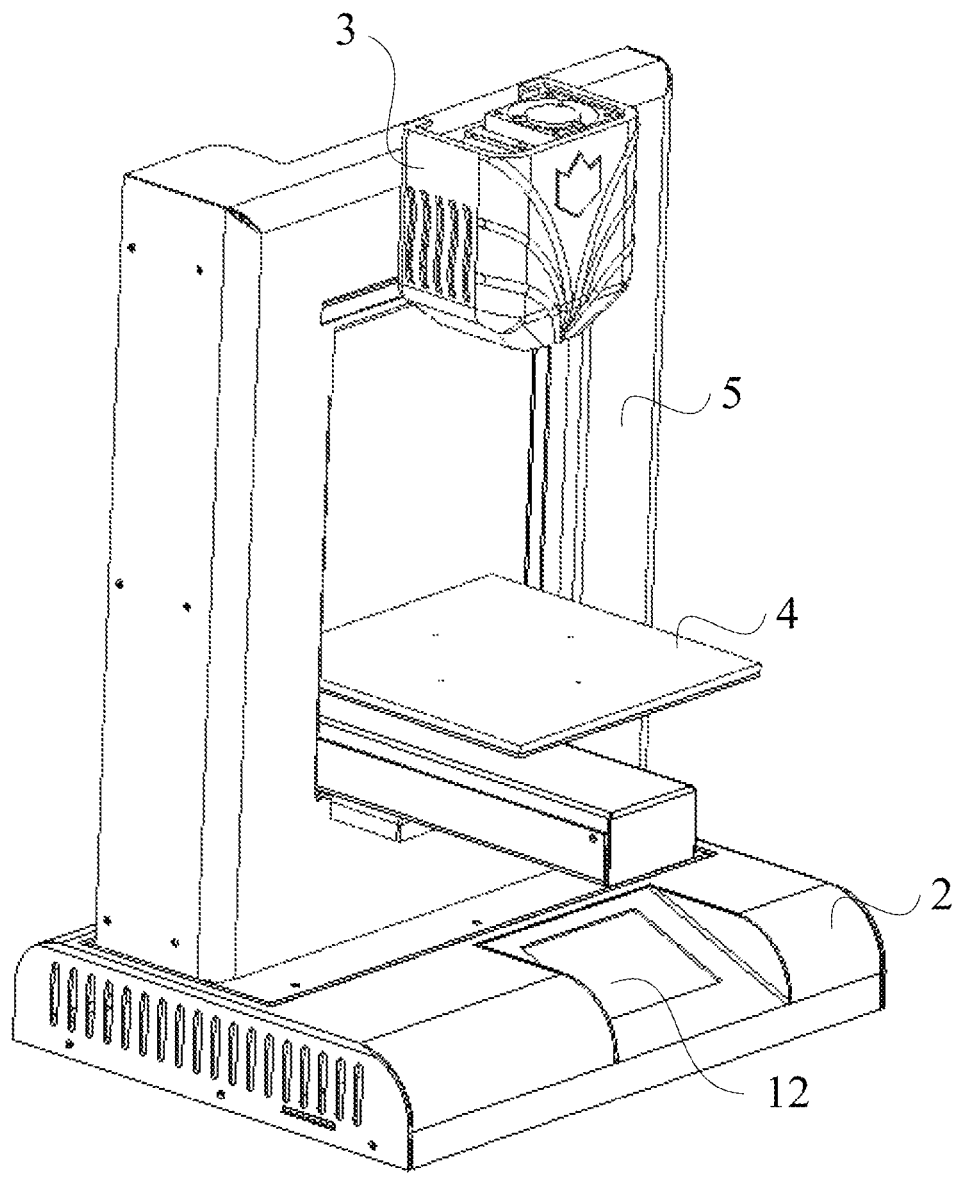
FIG. 1 is a schematic diagram of an additive manufacturing apparatus with assembled and dissembled feature according to an embodiment of the present invention.

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Referring to FIG. 1 to FIG. 11, an additive manufacturing apparatus with assembled and dissembled feature is provided according to an embodiment of the present invention, which includes:

A base 2 has cavity. A control circuit 1 is installed in the cavity. An upper surface of the base 2 defines at least one through hole 21 for an electrical socket 19 extending through the base 2 and being exposed on the upper surface of the base. A stand connecting member 201 (referring to FIG. 3) is provided on the upper surface.

A material deposition device 3 is used for depositing material. At least one beam connecting member 301 (referring to FIGS. 8, 9) is provided on the material deposition device 3.

A movable platform 4 is capable of moving along a Y axis direction for carrying the deposited material. The movable platform 4 is provided with at least one column connecting member 401 (referring to FIG. 5).

A stand 5 has at: least one column 51. A beam 52 is provided on a top of the column 51. The beam 52 is provided with a material deposition device connecting member 521 (referring to FIG. 5). The column 51 is provided with a movable platform connecting member 511 (referring to FIG. 5) A bottom of the column 51 is provided with at least one base connecting member 512 (referring to FIG. 3) corresponding to the base 2. The base connecting member 512 defines at least one through hole 53 for the electrical socket 19 extending through the base connecting member 512 and being exposed on the upper surface of the base connecting member 512.

Figure 5:
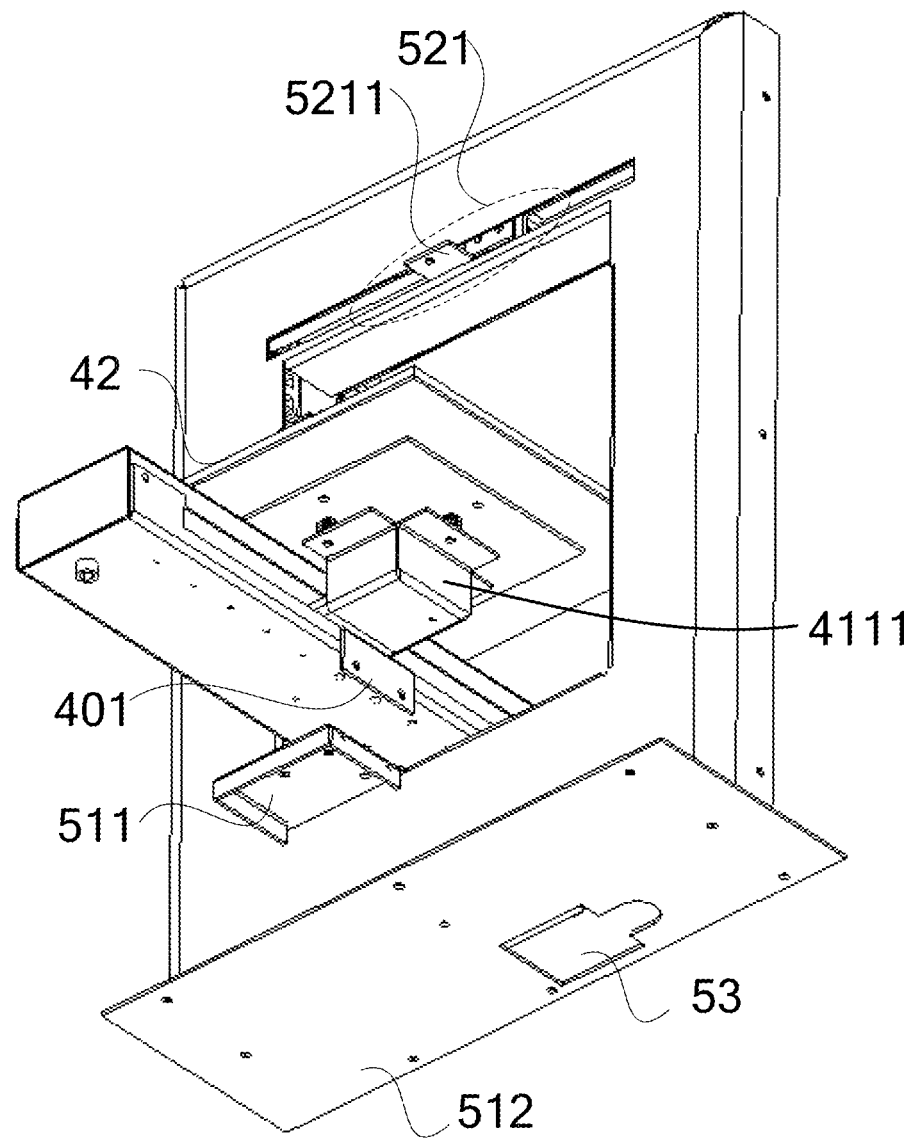
FIG. 5 is a schematic diagram of an additive manufacturing apparatus with assembled and dissembled feature according: to an embodiment of the present invention.
Figure 6:
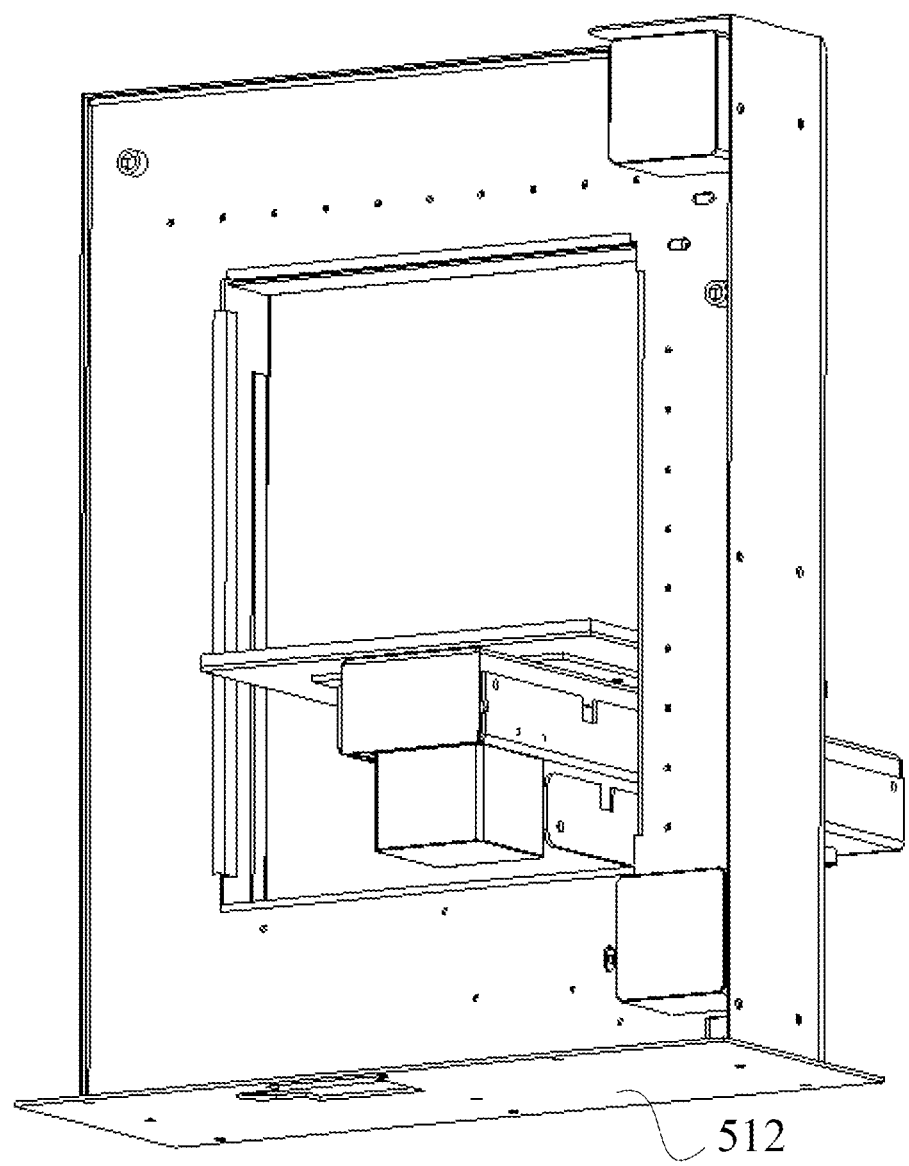
FIG. 6 is a schematic diagram of an additive manufacturing apparatus with assembled and dissembled feature according to an embodiment of the present invention.
Figure 7:
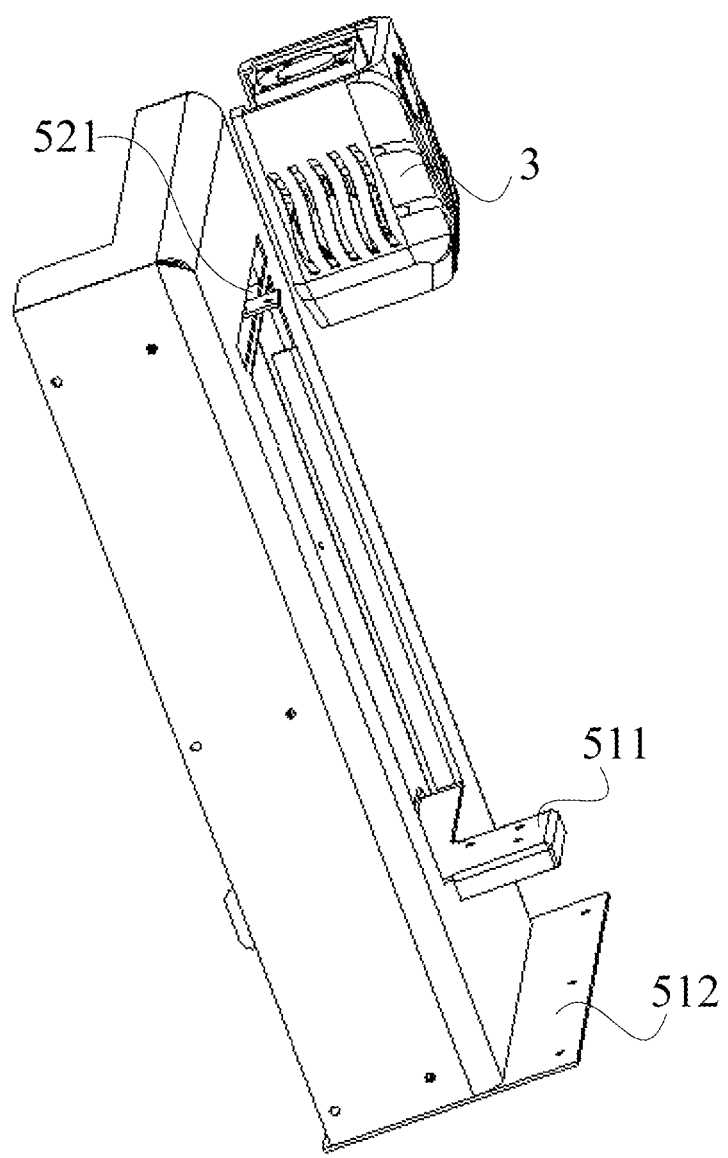
FIG. 7 is a schematic diagram of an additive manufacturing apparatus with assembled and dissembled feature according to an embodiment of the present invention.

Referring to FIG. 5 and FIG. 7, the material deposition device connecting member 521 is connected to the beam connecting member 301. The material deposition device 3 is mounted on the beam 52 of the stand 5, such that the material deposition device 3 is capable of moving along the beam 52 in an X axis direction.

Figure 11:
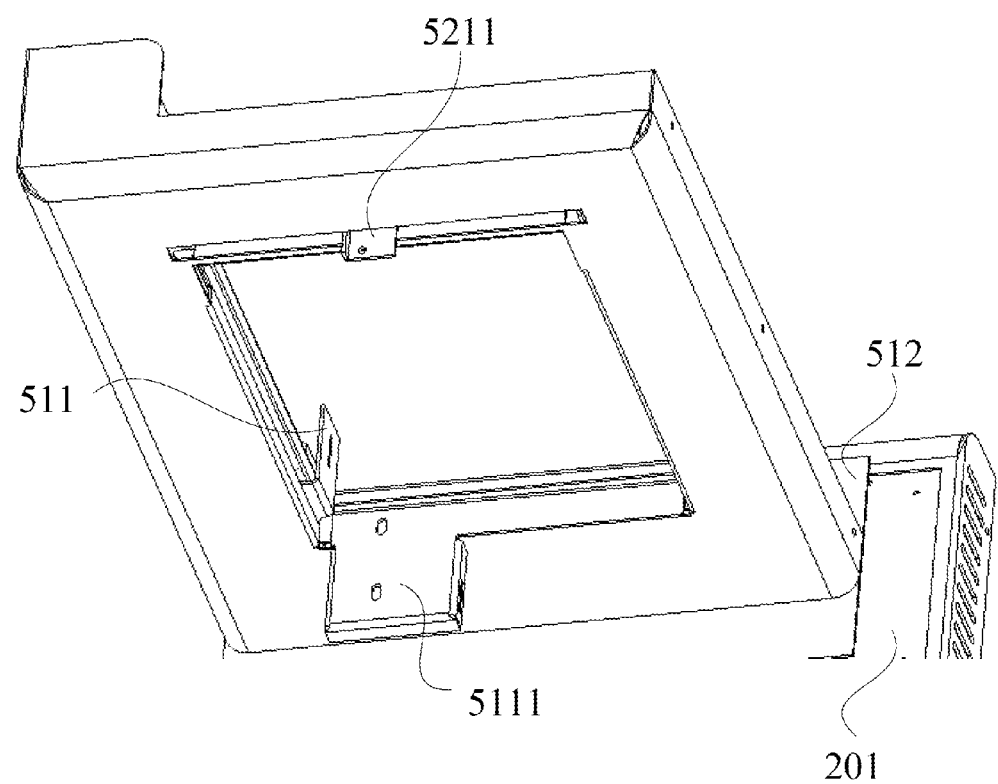
FIG. 11 is a schematic diagram of an additive manufacturing apparatus with assembled and dissembled feature according an embodiment of the present invention.

Referring to FIG. 5 and FIG. 11, the movable platform connecting member 511 is connected to the column connecting member 401. The movable platform 4 is mounted on the column 51 of the stand 5, such that the movable platform 4 is capable of moving along the column 51 in a Z axis direction.

Figure 3:
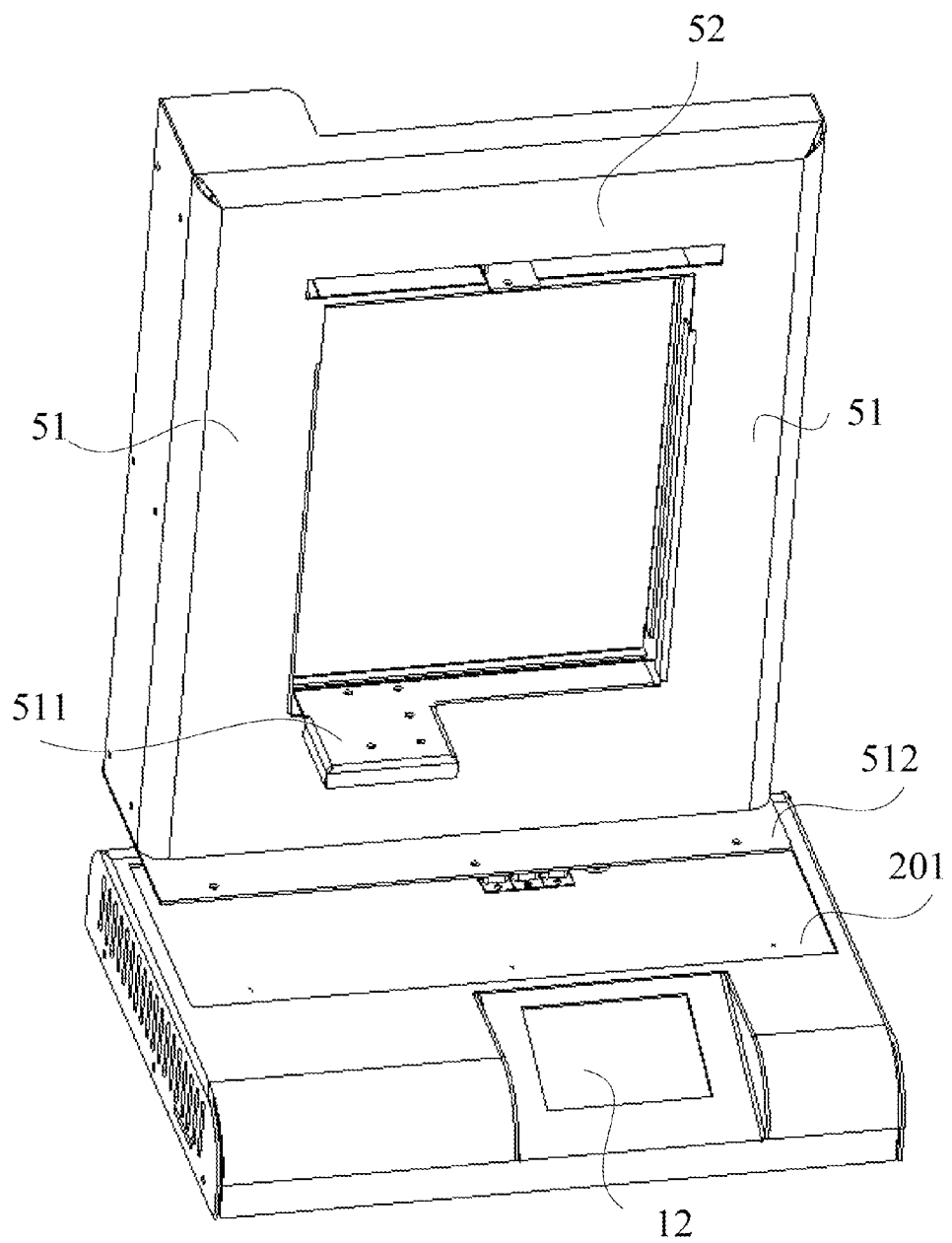
FIG. 3 is a schematic diagram of an additive manufacturing apparatus with assembled and dissembled feature according to an embodiment of the present invention.
Figure 4:
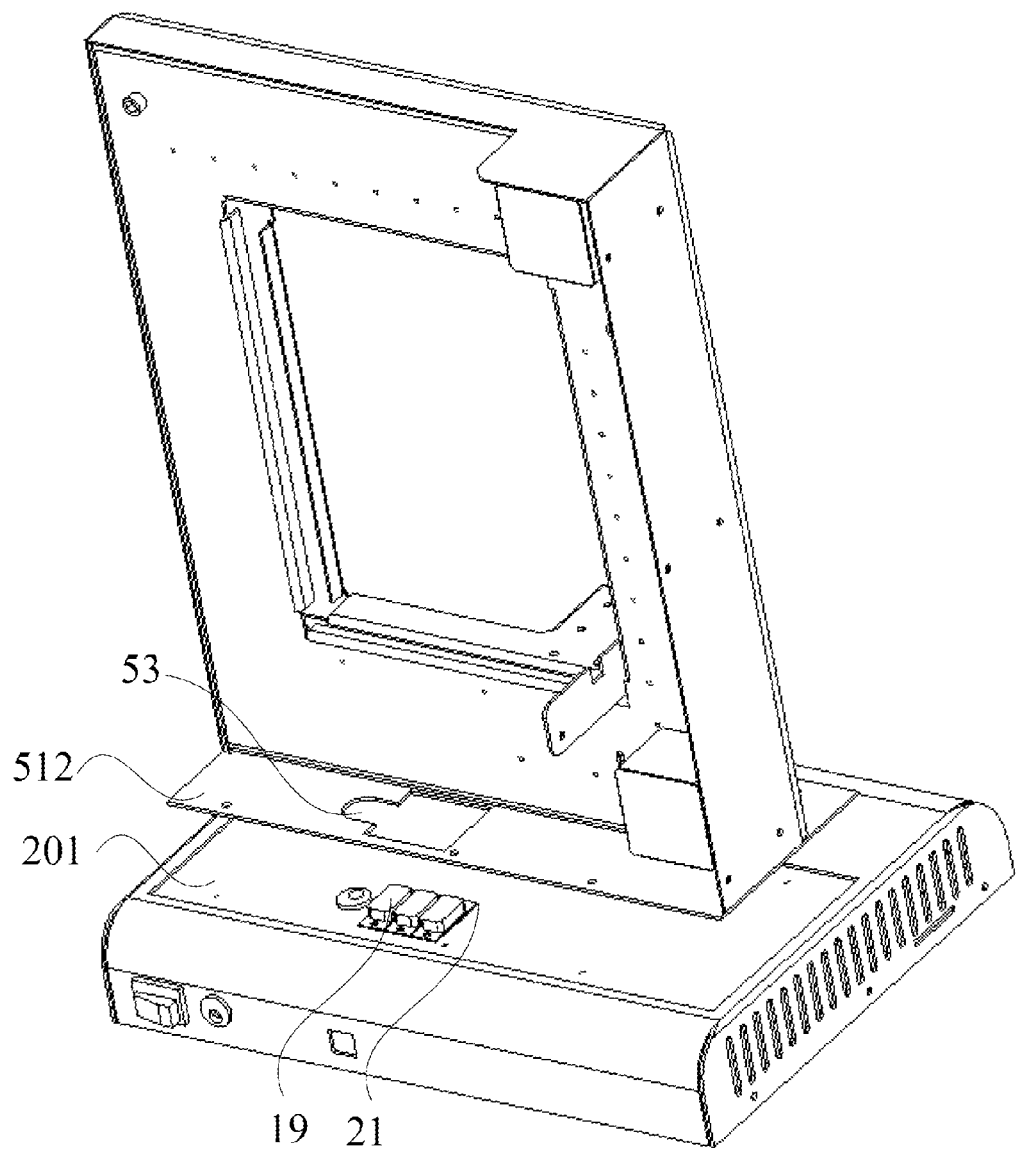
FIG. 4 is a schematic diagram of an additive manufacturing apparatus with assembled and dissembled feature according to an embodiment of the present invention.

Referring to FIG. 3, the stand connecting member 201 is connected and fastened to the corresponding base connecting member 512, and the stand 5 is vertically fixed to the upper surface of the base 2.

Referring to FIG. 1 to FIG. 11, in the additive manufacturing apparatus with assembled and dissembled feature is provided according to an embodiment of the present invention, a side of the electrical socket 19 exposed on the upper surface of the base 2 is respectively connected to the material deposition device 3, the movable platform 4, and the stand 5 for transmitting control signal and power to them.

Another side of the electrical socket 19 received in the cavity of the base 2 is coupled to the control circuit 1 for receiving power and a control signal outputted by the control circuit 1.

Figure 2:
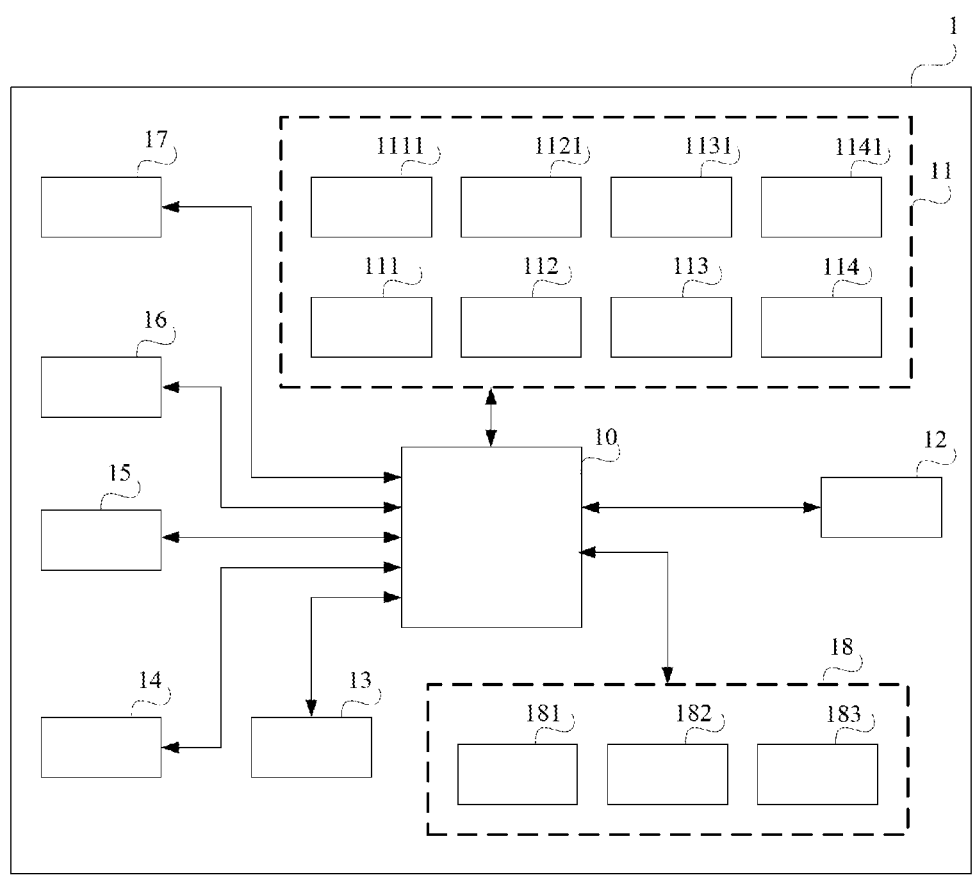
FIG. 2 is a schematic block diagram of a circuit of an additive manufacturing apparatus with assembled and dissembled feature according to an embodiment of the present invention.

FIG. 2 is a schematic block diagram of a circuit of the additive manufacturing apparatus with assembled and dissembled feature according to an embodiment of the present invention. The control circuit 1 includes: a power source 16, a controller 10, a user interface module 12 controlled by the controller 10, a fan control signal transmission module 13, a heating control signal transmission module 14, a temperature control signal transmission module 15, a data interface module 17, and a motor control signal transmission module 11.

The fan control signal transmission module 13 is connected to the material deposition device 3 to drive control a fan of the material deposition device 3.

The heating control signal transmission module 14 is connected to the material deposition device 3 to drive control a heating device of the material deposition device 3.

The temperature control signal transmission module 15 is connected to the material deposition device 3 to adjust a heating temperature of the heating device.

The motor control signal transmission module 11 is connected to the material deposition device connecting member 521, the movable platform 4, and the movable platform connecting member 511, respectively, such that the material deposition device connecting member 521 is controlled to move along the X axis direction, the movable platform 4 is controlled to move along the Y axis direction, and the movable platform connecting member 511 is controlled to move along the Z axis direction.

The power source 16 is respectively connected to the material deposition device 3, the material deposition device connecting member 521, the movable platform 4, and the movable platform connecting member 511 for providing power to them.

Referring to FIG. 2, according to the additive manufacturing apparatus with assembled and dissembled feature according to an embodiment of the present invention, in order to achieve a precise control of the X axis direction motor, the Y axis direction motor, and the Z axis direction motor, the control circuit 1 of the present embodiment further includes a signal detection module 18 connected to the controller 10. The signal detection module 18 is configured to detect coordinate origin data of X axis, Y axis, and Z axis directions, and send the detected coordinate origin data to the controller 10. The controller 10 is configured to set the coordinate origin of the additive manufacturing apparatus with assembled and dissembled feature as a datum point, and calculate the movement direction and distance of motors of X axis, Y axis, and Z axis directions according to the coordinate origin of the design data, and venerate motor drive control signals of X axis, Y axis, and Z axis directions.

Specifically; the signal detection module 18 includes an X axis direction signal detection interface 181, a Y axis direction signal detection interface 182, and a Z axis direction signal detection interface 183, which are configured to detect coordinate origin data of X axis, Y axis, and Z axis directions of the additive manufacturing apparatus with assembled and dissembled feature.

The motor control signal transmission module 11 includes an X axis direction control signal transmission module 111, which can control and drive the X axis direction motor according to the controller 10. The motor driving control signal is transmitted to the X axis direction motor through an X axis direction control signal transmission interface 1111.

The motor control signal transmission module 11 includes a Y axis direction control signal transmission module 112, which can control and drive the Y axis direction motor according to the controller 10. The motor driving control signal is transmitted to the Y axis direction motor through a Y axis direction control signal transmission interface 1121.

The motor control signal transmission module 11 includes a Z axis direction control signal transmission module 113, which can control and drive the Z axis direction motor according to the controller 10. The motor driving control signal is transmitted to the Z axis direction motor through a Z axis direction control signal transmission interface 1131.

Referring to FIG. 1 to FIG. 11, according to the additive manufacturing apparatus with assembled and dissembled feature according to an embodiment of the present invention, the control circuit 1 receives the user's instruction through the user interface module 12 and the design data through the data interface module 17, and control the material deposition device 3 to deposit material. The control circuit 1 is also configured to control the movement of the material deposition device connector 521, the movable platform 4, and the movable platform connecting member 511 to move along the X axis, Y axis, and Z axis directions, respectively, thereby depositing the material on the movable platform 4 and forming a three-dimensional model, i.e. 3D printing.

The design data is a three-dimensional model file, which can be an STL file or other formats file.

Figure 8:
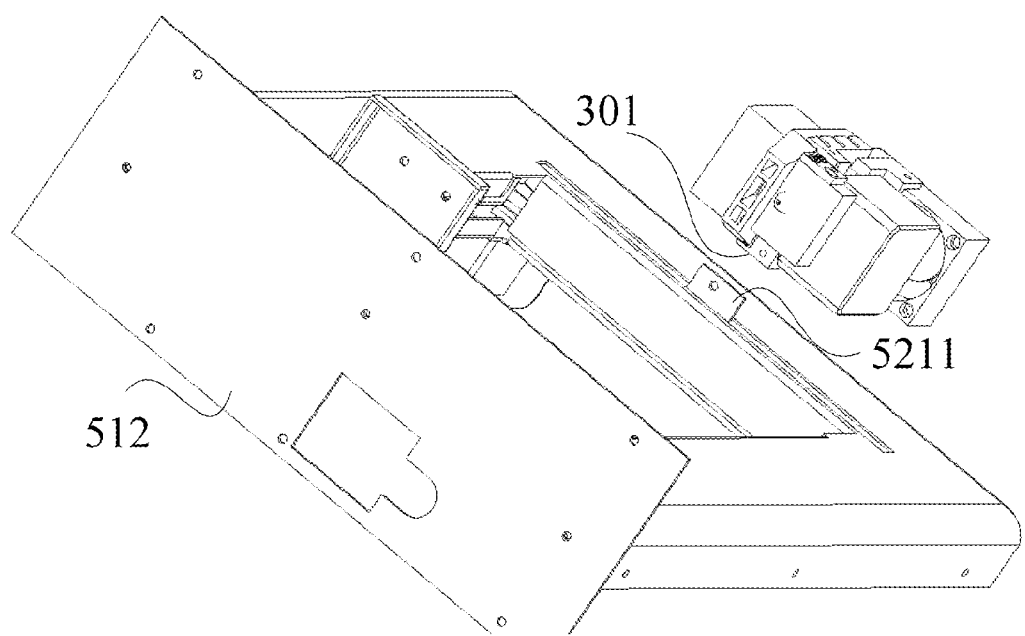
FIG. 8 is a schematic diagram of an additive manufacturing apparatus with assembled and dissembled feature according to an embodiment of the present invention.
Figure 9:
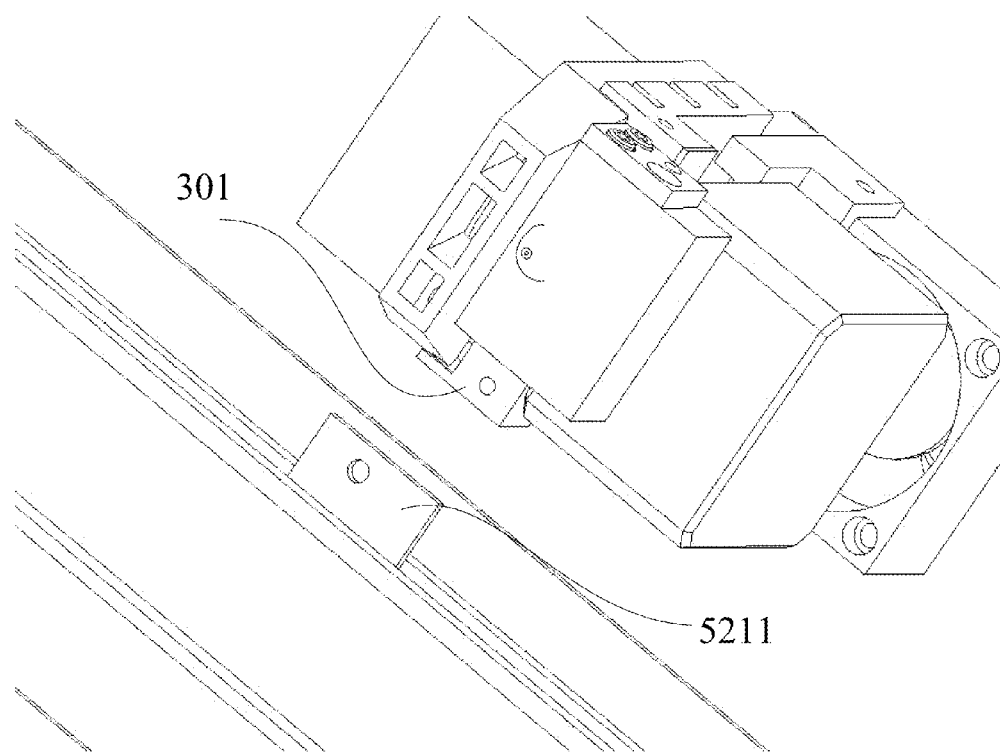
FIG. 9 is a schematic diagram of an additive manufacturing apparatus with assembled and dissembled feature according to an embodiment of the present invention.
Figure 10:
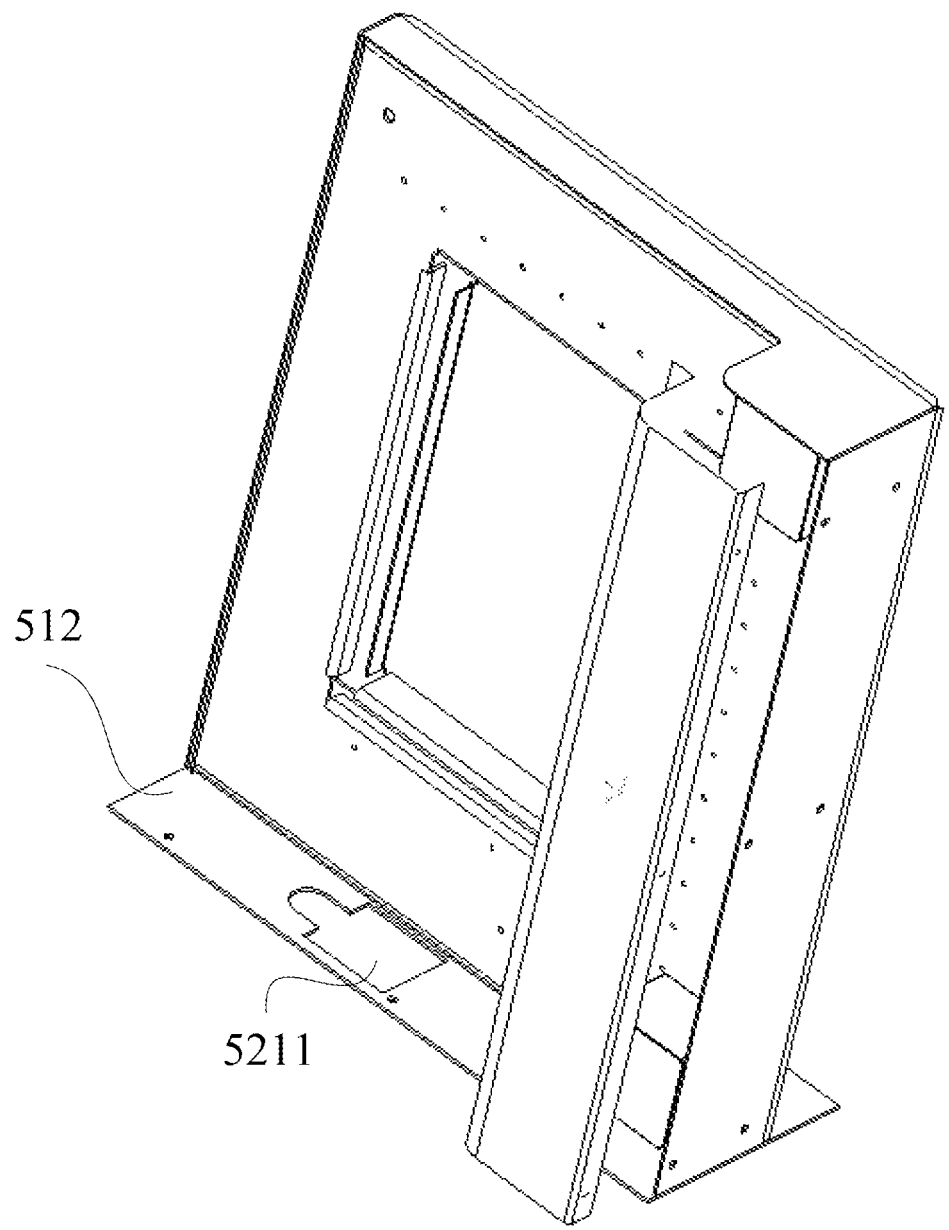
FIG. 10 is a schematic diagram of an additive manufacturing apparatus with assembled and dissembled feature according to an embodiment of the present invention.

Referring to FIG. 8, FIG. 9, and FIG. 11, according to the additive manufacturing apparatus with assembled and dissembled feature according to an embodiment of the present invention, the material deposition device 521 connecting member includes a guiding rail, a slider, an X axis direction motor, and an X axis direction movement support 5211. The guiding rail is fixed to the beam 52, the slider is disposed on the guiding rail, the X axis direction movement support is fixed to the slider.

The X axis direction motor drives the slider to make reciprocating motion in the X axis direction along the guiding rail.

The X axis direction movement support 5211 is threadedly fastened to the material deposition device 3, thereby the material deposition device 5211 is capable of making reciprocating motion in the X axis direction along with the slider.

Referring to FIG. 5, according to the additive manufacturing apparatus with assembled and dissembled feature according to an embodiment of the present invention, the movable platform 4 includes a guiding rail, a slider, a Y axis direction motor, a Y axis direction movement support 4111, and a material carrying plate 42.

The guiding rail is threadedly fastened to the Y axis direction movement support 4111, the slider is disposed on the guiding rail.

The Y axis direction motor drives the slider to make reciprocating motion in the Y axis direction along the guiding rail;

The material carrying plate 42 is fixed to the slider, thereby the material carrying plate 42 is capable of making reciprocating motion in the Y axis direction to carry the deposited material from the material deposition device 3.

Referring to FIG. 11, according to the additive manufacturing apparatus with assembled and dissembled feature according to an embodiment of the present invention, the movable platform connecting member 511 includes a guiding rail, a slider, a Z axis direction motor, and a Z axis direction movement support 5111. The guiding rail is fastened to the column, the slider is disposed on the guiding, rail. The Z axis direction movement support 5111 is fixed to the slider.

The Z axis direction motor drives the slider to make reciprocating motion in the Z axis direction along the guiding rail.

The Z axis direction movement support 5111 is threadedly fastened to the column connecting member 401 of the movable platform, thereby the movable platform 4 is capable of making reciprocating motion in the Z axis direction.

The material of the embodiments includes but not limits to resin, plastic, PLA, ABS and other materials.

Figure 12:
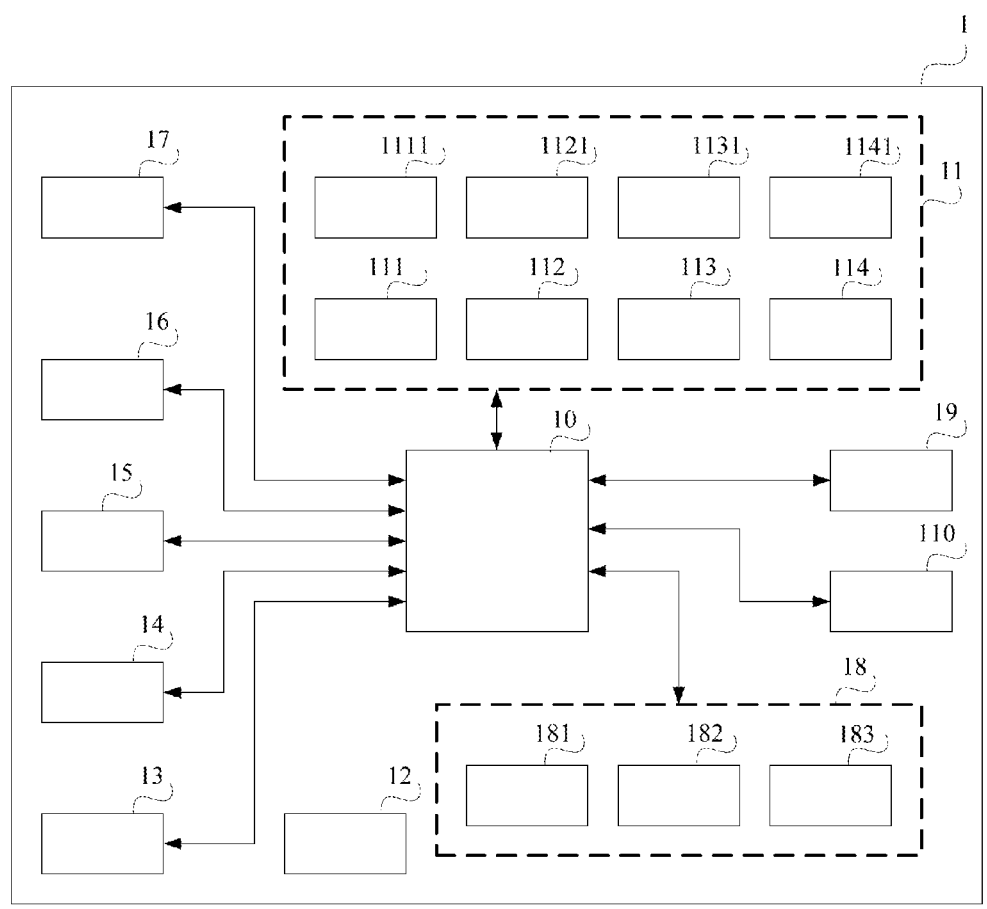
FIG. 12 is a schematic block diagram of an circuit of an additive manufacturing apparatus with assembled and dissembled feature according to an embodiment of the present invention.

In order to adapt to the thermal shrinkage of some material, such as ABS, another embodiment is proposed to prevent the three-dimensional model from deformation or cracking, thus improving the success rate of the material forming. FIG. 12 shows an additive manufacturing apparatus with assembled and dissembled feature, a movable platform 4 thereof further includes a heating device. The control circuit 1 further includes a platform temperature control signal transmission module 19 and a platform heating control signal transmission module 110 for the heating, device of the movable platform.

The platform heating control signal transmission module 110 is connected to the heating device of the movable platform to drive control the heating thereof. The platform temperature control signal transmission module 19 is connected to the heating device of the movable platform to adjust the heating temperature thereof.

Referring, to FIG. 1 to FIG. 12, according to the additive manufacturing apparatus with assembled and dissembled feature according to an embodiment of the present invention, the motor control signal transmission module includes an X axis direction control signal transmission interface 1111, a Y axis direction control signal transmission interface 1121, a Z direction control signal transmission interface 1131, and/or a material deposition device motor control signal transmission interface 1141, which is a CH socket.

The electrical socket described above includes at least one D-type socket and power socket.

At least one pin of the CH socket is connected to at least one pin of the D-type socket, such that the control signal is transmitted to the material deposition device 3, the material deposition device connecting member 521, the movable platform 4, and the movable platform connecting member 511, respectively.

The signal transmission interfaces of the fan control signal transmission module, the heating control signal transmission module, the temperature control signal transmission module, the motor control signal transmission module, the signal detection module, the platform temperature control signal transmission module, and/or the platform heating control signal transmission module are XH sockets. At least one XH socket is connected to at least one pin of the electrical socket, the signal is transmitted to the material deposition device, the material deposition device connecting member, the movable platform, the movable platform connecting member via the electrical socket.

Figure 13:
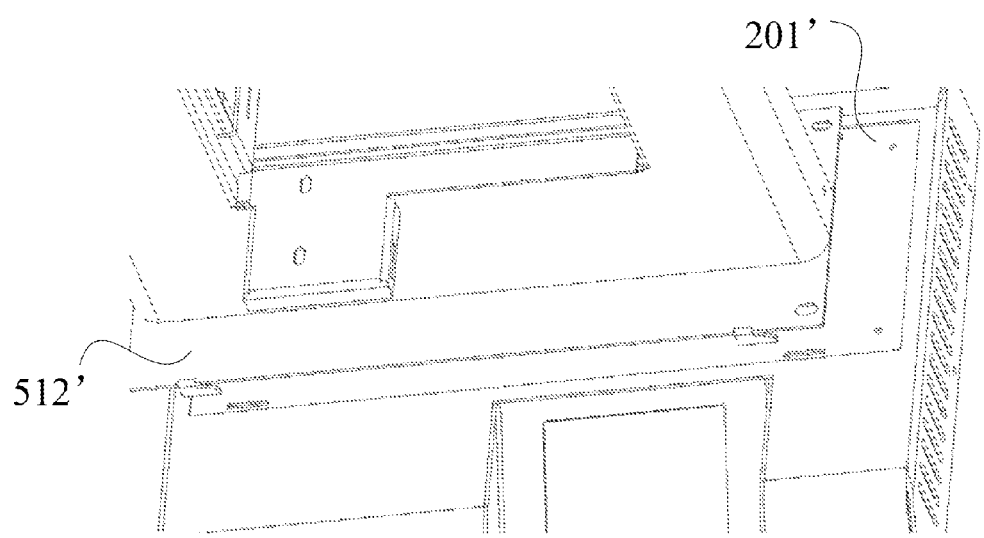
FIG. 13 is a schematic diagram of an additive manufacturing apparatus with assembled and dissembled feature according to an embodiment of the present invention.

Referring FIG. 13, according to the additive manufacturing apparatus with assembled and dissembled feature according to an embodiment of the present invention, the stand connecting member 201' is connected and fastened to the base connecting member 512 via a latch, and the stand 5' is vertically fixed to the upper surface of the base 2'.

Figure 14:
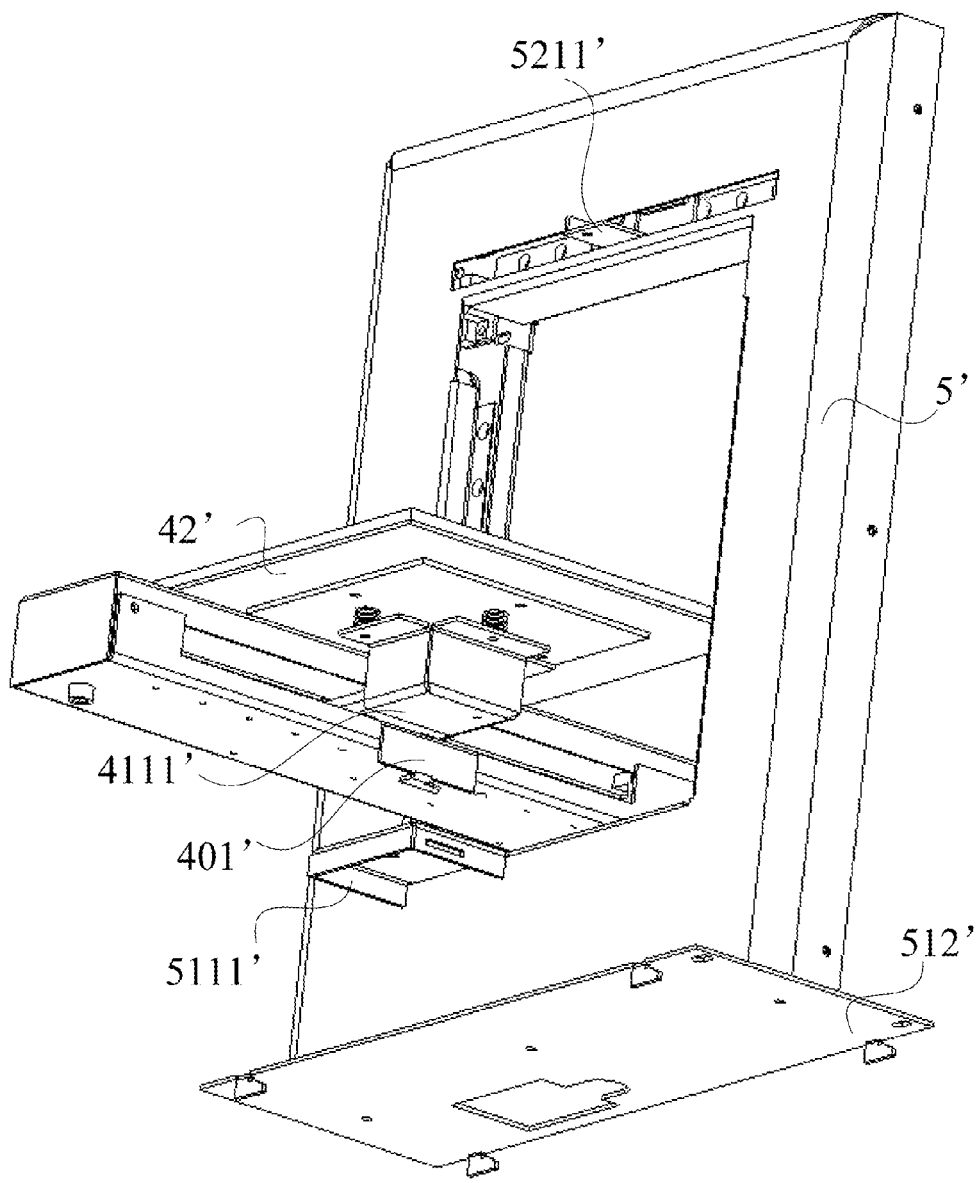
FIG. 14 is a schematic diagram of au additive manufacturing apparatus with assembled and dissembled feature according to an embodiment of the present invention.

Referring to FIG. 14, according to the additive manufacturing apparatus with assembled and dissembled feature according to an embodiment of the present invention, the X axis direction movement support 5211' is fastened to the material deposition device 3' via a latch, thereby the material deposition device 3' is capable of making reciprocating motion in the X axis direction along with the slider.

Referring to FIG. 14, according to the additive manufacturing apparatus with assembled and dissembled feature according to an embodiment of the present invention, the guiding rail is fastened to the Y axis direction movement support 4111 via a latch, the slider is disposed on the guiding rail. The Y axis direction motor drives the slider to make reciprocating motion in the Y axis direction along the guiding rail. The material carrying plate 42' is fixed to the slider, thereby the material carrying plate 42' is capable of making reciprocating motion in the Y axis direction to carry the deposited material from the material deposition device 3'.

Referring to FIG. 14, according to the additive manufacturing apparatus with assembled and dissembled feature according to an embodiment of the present invention the Z axis direction movement support 5111' is fastened to the column connecting member 401' of the movable platform via a latch, thereby the movable platform 4' is capable of making reciprocating motion in the Z axis direction.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. An additive manufacturing apparatus with assembled and dissembled feature, comprising:
   a base having a cavity, wherein a control circuit is installed in the cavity, an upper surface of the base defines at least one through hole for an electrical socket extending through the base and being exposed on the upper surface; a stand connecting member is provided on the upper surface;
   a material deposition device for depositing material, at least one beam connecting member is provided on the material deposition device;
   a movable platform capable of moving along a Y axis direction for carrying the deposited material, wherein the movable platform is provided with at least one column connecting member; and
   a stand having at least one column, wherein a beam is provided on a top of the at least one column; the beam is provided with a material deposition device connecting member; the at least one column is provided with a movable platform connecting member; a bottom of the at least one column is provided with at least one base connecting member corresponding to the base;
   wherein the material deposition device connecting member is connected to the beam connecting member, the material deposition device is mounted on the beam of the stand, and the material deposition device is capable of moving along the beam in an X axis direction;
   the movable platform connecting member is connected to the at least one column connecting member, the movable platform is mounted on the at least one column of the stand, and the movable platform is capable of moving along the at least one column in a Z axis direction;
   the stand connecting member is connected and fastened to the at least one base connecting member, and the stand is vertically fixed to the upper surface of the base.

2. The additive manufacturing apparatus with assembled and dissembled feature according to claim 1, wherein the at least one base connecting member defines at least one through hole for the electrical socket extending through the at least one base connecting member and being exposed on the upper surface of the at least one base connecting member.

3. The additive manufacturing apparatus with assembled and dissembled feature according to claim 2, wherein a side of the electrical socket received in the cavity is coupled to the control circuit for receiving a control signal outputted by the control circuit and power;
   another side of the electrical socket exposed on the upper surface of the base is respectively connected to the material deposition device, the movable platform, and the stand for transmitting control signal and power.

4. The additive manufacturing apparatus with assembled and dissembled feature according to claim 3, wherein the control circuit comprises: a power source, a controller, a user interface module controlled by the controller, a fan control signal transmission module, a heating control signal transmission module, a temperature control signal transmission module, a data interface module, and a motor control signal transmission module;
   the fan control signal transmission module is connected to the material deposition device to drive control a fan of the material deposition device;
   the heating control signal transmission module is connected to the material deposition device to drive control a heating device of the material deposition device;
   the temperature control signal transmission module is connected to the material deposition device to adjust a heating temperature of the heating device;
   the motor control signal transmission module is connected to the material deposition device connecting member, the movable platform, and the movable platform connecting member, respectively, so as to control the movement thereof along the X axis direction, Y axis direction, and Z axis direction;
   the power source is respectively connected to the material deposition device, the material deposition device connecting member, the movable platform, and the movable platform connecting member for providing power.

5. The additive manufacturing apparatus with assembled and dissembled feature according to claim 4, wherein the control circuit further comprises a signal detection module connected to the controller, the signal detection module is configured to detect coordinate origin data of X axis, Y axis, and Z axis directions, and send the detected coordinate origin data to the controller;
   the controller is configured to set the coordinate origin of the additive manufacturing apparatus with assembled and dissembled feature as a datum point, and calculate the movement direction and distance of motors of X axis, Y axis, and Z axis directions according to the coordinate origin of the design data, and generate motor drive control signals of X axis, Y axis, and Z axis directions.

6. The additive manufacturing apparatus with assembled and dissembled feature according to claim 5, wherein the motor control signal transmission module comprises an X axis direction control signal transmission interface, a Y axis direction control signal transmission interface, and a Z direction control signal transmission interface;
   The motor control signal transmission module further comprises a material deposition device motor control signal transmission interface connected to the material deposition device to control a deposition motor thereof.

7. The additive manufacturing apparatus with assembled and dissembled feature according to claim 6, wherein the control circuit is configured to receive a user instruction through the user interface module, and receive the design date through the data interface module, and control the material deposition device to deposit material; the control circuit is configured to control the movement of the material deposition device connector, the movable platform, and the movable platform connecting member to move along the X axis, Y axis, and Z axis directions, respectively, thereby depositing the material on the movable platform and forming a three-dimensional model.

8. The additive manufacturing apparatus with assembled and dissembled feature according to claim 6, wherein the movable platform further comprises a heating device; and the control circuit further comprises a platform temperature control signal transmission module and a platform heating control signal transmission module for the heating device of the movable platform;
   the platform heating control signal transmission module is connected to the heating device of the movable platform to drive control the heating thereof;
   the platform temperature control signal transmission module is connected to the heating device of the movable platform to adjust the heating temperature thereof.

9. The additive manufacturing apparatus with assembled and dissembled feature according to claim 8, wherein the electrical socket comprises at least one D-type socket and power socket;

the fan control signal transmission module, the heating control signal transmission module, the temperature control signal transmission module, the motor control signal transmission module, the signal detection module, the platform temperature control signal transmission module, and/or the platform heating control signal transmission module are connected to at least one pin of the electrical socket, the signal is transmitted to the material deposition device, the material deposition device connecting member, the movable platform, the movable platform connecting member via the electrical socket.

10. The additive manufacturing apparatus with assembled and dissembled feature according to claim 1, wherein the material deposition device connecting member comprises a guiding rail, a slider, an X axis direction motor, and an X axis direction movement support;

the guiding rail is fixed to the beam, the slider is disposed on the guiding rail, the X axis direction movement support is fixed to the slider;

the X axis direction motor drives the slider to make reciprocating motion in the X axis direction along the guiding rail;

the X axis direction movement support is fastened to the material deposition device via thread or latch, thereby the material deposition device is capable of making reciprocating motion in the X axis direction along with the slider.

11. The additive manufacturing apparatus with assembled and dissembled feature according to claim 1, wherein the movable platform comprises a guiding rail, a slider, a Y axis direction motor, a Y axis direction movement support, and a material carrying plate;

the guiding rail is fastened to the Y axis direction movement support via thread or latch, the slider is disposed on the guiding rail;

the Y axis direction motor drives the slider to make reciprocating motion in the Y axis direction along the guiding rail;

the material carrying plate is fixed to the slider, thereby the material carrying plate is capable of making reciprocating motion in the Y axis direction to carry the deposited material from the material deposition device.

12. The additive manufacturing apparatus with assembled and dissembled feature according to claim 1, wherein the movable platform connecting member comprises a guiding rail, a slider, a Z axis direction motor, and a Z axis direction movement support;

the guiding rail is fastened to the at least one column, the slider is disposed on the guiding rail;

the Z axis direction movement support is fixed to the slider;

the Z axis direction motor drives the slider to make reciprocating motion in the Z axis direction along the guiding rail;

the Z axis direction movement support is fastened to the at least one column connecting member of the movable platform via thread or latch, thereby the movable platform is capable of making reciprocating motion in the Z axis direction.

\* \* \* \* \*